US012574281B2

(12) United States Patent
Reynolds et al.

(10) Patent No.: US 12,574,281 B2
(45) Date of Patent: Mar. 10, 2026

(54) SECURE MANAGEMENT OF ACCESS TO HOST DEVICE REMOTE MANAGEMENT FUNCTIONALITY

(71) Applicant: Hewlett-Packard Development Company, L.P., Spring, TX (US)

(72) Inventors: Douglas Reynolds, Fort Collins, CO (US); Peter Seiler, Fort Collins, CO (US); Eric John Gressman, Fort Collins, CO (US); Patrick S. Anderson, Fort Collins, CO (US); J. Michael Stahl, Fort Collins, CO (US); Byron A. Alcorn, Fort Collins, CO (US); Gregory Mark Hughes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/042,196

(22) PCT Filed: Aug. 28, 2020

(86) PCT No.: PCT/US2020/048359
§ 371 (c)(1),
(2) Date: Feb. 17, 2023

(87) PCT Pub. No.: WO2022/046067
PCT Pub. Date: Mar. 3, 2022

(65) Prior Publication Data
US 2024/0031216 A1 Jan. 25, 2024

(51) Int. Cl.
H04L 41/045 (2022.01)
H04L 12/66 (2006.01)

(52) U.S. Cl.
CPC ............ H04L 41/045 (2022.05); H04L 12/66 (2013.01)

(58) Field of Classification Search
None
See application file for complete search history.

(56) References Cited

U.S. PATENT DOCUMENTS

| | | | |
|---|---|---|---|
| 7,428,606 B2 | 9/2008 | Liu et al. | |
| 8,332,523 B2 | 12/2012 | Weinstock et al. | |
| 9,542,006 B2 | 1/2017 | Soffer | |
| 9,791,944 B2 | 10/2017 | Soffer | |
| 10,936,191 B1 * | 3/2021 | Lakshminarayanan | ...................... G06F 3/067 |
| 2002/0178295 A1 * | 11/2002 | Buczek | ................... H04L 41/22 709/250 |
| 2006/0280195 A1 * | 12/2006 | Lopez | ..................... H04L 69/14 370/465 |

(Continued)

FOREIGN PATENT DOCUMENTS

WO    WO-2017022008 A1 *    2/2017

*Primary Examiner* — Ario Etienne
*Assistant Examiner* — Mohammad Yousuf A. Mian
(74) *Attorney, Agent, or Firm* — Quarles & Brady LLP

(57) ABSTRACT

A gateway device includes a host-facing network interface to connect to a network interface of a host device at which remote management functionality of the host device is exposed. The gateway device includes a network-facing network interface to connect to a network. The gateway device includes a processor, and a memory storing program code executable by the processor to securely manage access over the network to the remote management functionality of the host device.

17 Claims, 5 Drawing Sheets

(56)                     References Cited

U.S. PATENT DOCUMENTS

| | | | |
|---|---|---|---|
| 2008/0137673 | A1 | 6/2008 | Phuah et al. |
| 2013/0326039 | A1* | 12/2013 | Shah ..................... H04L 41/344 |
| | | | 709/223 |
| 2014/0007214 | A1 | 1/2014 | Qureshi et al. |
| 2014/0165183 | A1* | 6/2014 | Dharmadhikari ... H04L 63/0209 |
| | | | 726/13 |
| 2015/0026302 | A1* | 1/2015 | Yamada .............. H04L 12/2812 |
| | | | 709/218 |
| 2016/0057008 | A1 | 2/2016 | Liu |
| 2020/0274851 | A1* | 8/2020 | Qiao ................... H04L 63/0263 |
| 2020/0274903 | A1* | 8/2020 | Loiseau ................. H04L 12/66 |

* cited by examiner

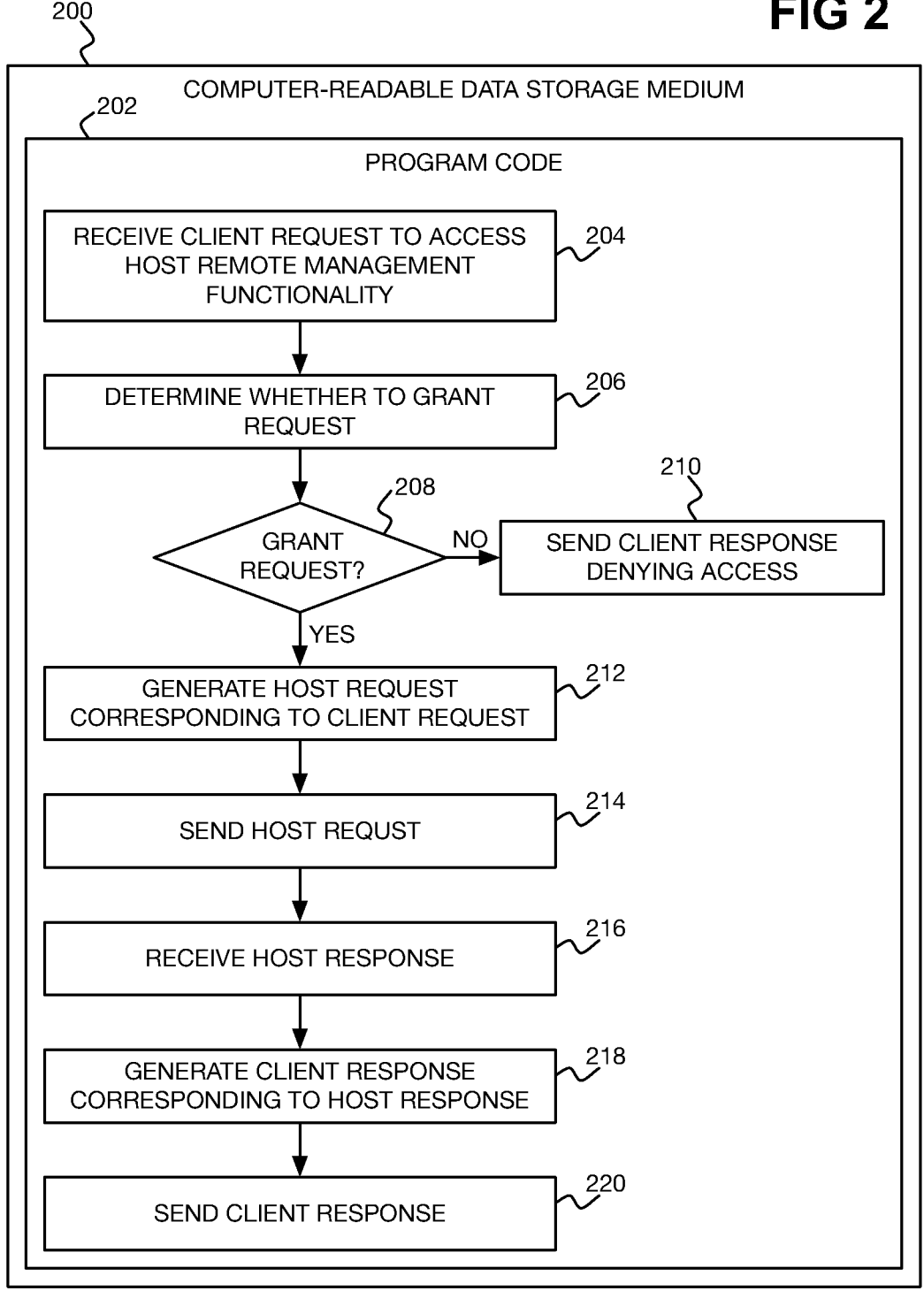

COMPUTER-READABLE DATA STORAGE MEDIUM

202

PROGRAM CODE

RECEIVE CLIENT REQUEST TO ACCESS HOST REMOTE MANAGEMENT FUNCTIONALITY — 204

DETERMINE WHETHER TO GRANT REQUEST — 206

GRANT REQUEST? — 208

NO → SEND CLIENT RESPONSE DENYING ACCESS — 210

YES

GENERATE HOST REQUEST CORRESPONDING TO CLIENT REQUEST — 212

SEND HOST REQUST — 214

RECEIVE HOST RESPONSE — 216

GENERATE CLIENT RESPONSE CORRESPONDING TO HOST RESPONSE — 218

SEND CLIENT RESPONSE — 220

SECURE MANAGEMENT OF ACCESS TO HOST DEVICE REMOTE MANAGEMENT FUNCTIONALITY

BACKGROUND

Enterprises and other organizations can often have tens, hundreds, thousands, and even more computers and other types of computing devices for usage by employees and other users. Administrators or other users of the organizations may be responsible for managing the computing devices for configuration, updating, monitoring, and other purposes. The administrators may be able to remotely manage the computing devices over a network, without having to physically access each device.

BRIEF DESCRIPTION OF THE DRAWINGS

FIG. 2 is a diagram of an example computer-readable data storage medium storing program code executable by a gateway device to securely manage access to the remote management functionality of a host device over a network.

DETAILED DESCRIPTION

Figures 1A, 1B:
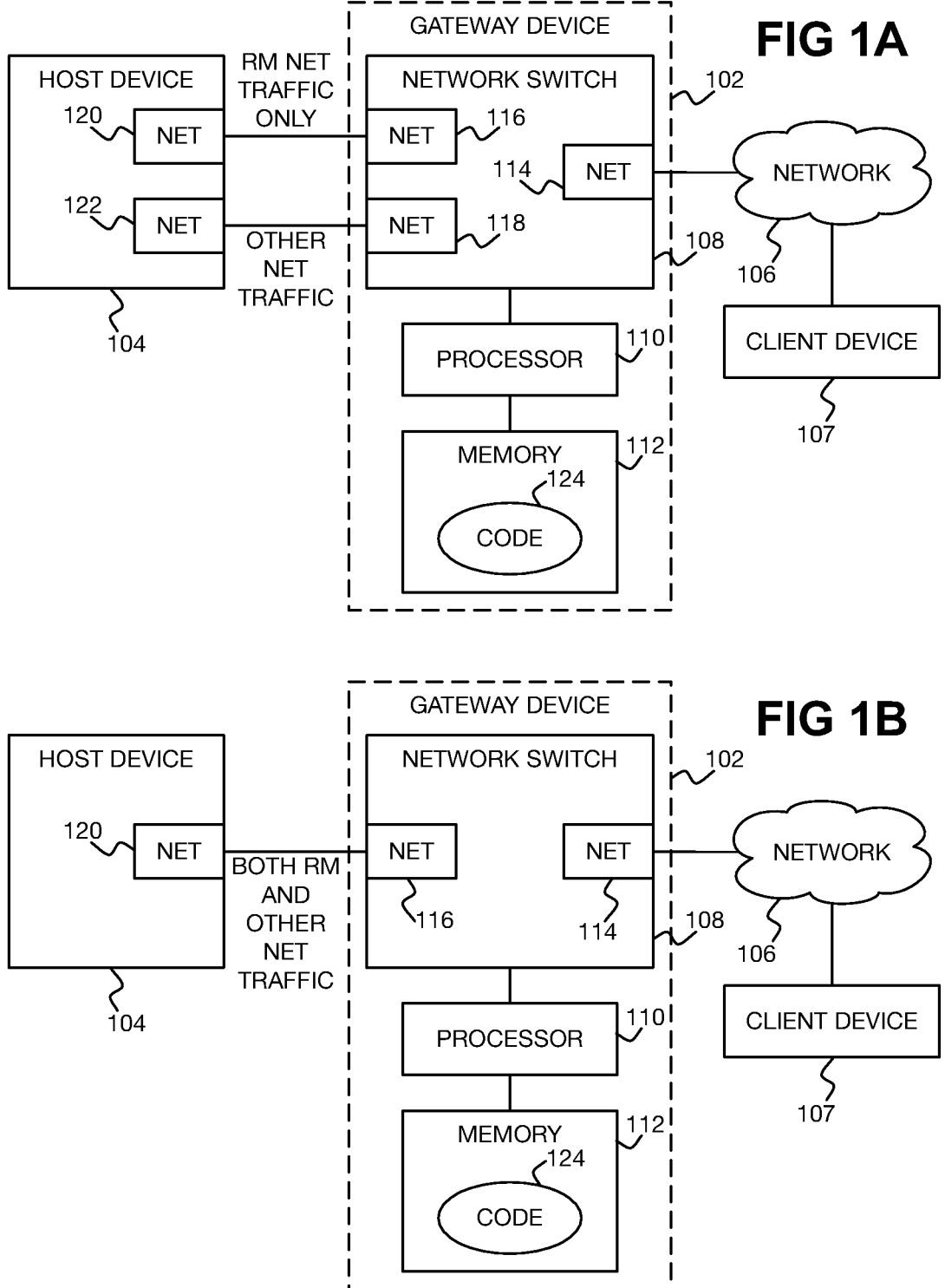
FIGS. 1A, 1B, 1C, 1D, and 1E are diagrams of examples of a gateway device for securely managing access to the remote management functionality of a host device over a network.

As noted in the background, computing devices like computers can be remotely managed over a network. Such remote management can include configuring hardware and software parameters of the devices, installing and updating software on the devices, debugging and diagnosing issues remotely, and monitoring the operation of the devices. Remote management can also include remotely rebooting the computing devices, and remotely powering off and on the computing devices.

One type of remote management is referred to as out-of-band or hardware-based remote management, in which a computing device has a service processor separate from the main processor that runs the operating system and other program code of the device, and which may be not accessible by the end user of the device. Such out-of-band management can use a communication channel different from that used by the main processor, and does not depend on the presence of an operating system or a locally installed management agent on the operating system. An example of out-of-band management is INTEL Active Management Technology (IAMT), available from Intel Corp., of Santa Clara, Calif.

A computing device's remote management functionality may be exposed at the device on certain logical network ports having corresponding port numbers. However, computing devices are frequently connected to outside or external networks, like the Internet, through network routers, firewalls, and other network devices, which may restrict access to such network ports. For example, the network ports may be closed at the network devices, in that the network devices do not permit incoming network traffic (and outgoing network traffic in some cases as well) on the ports.

In such instances, a computing device cannot be remotely managed even if its remote management functionality is enabled.

Furthermore, certain types of remote management have security vulnerabilities. A computing device's remote management functionality may not be able to be updated to resolve newly discovered vulnerabilities. Even if the remote management functionality can be updated to address existing security vulnerabilities, it may have undiscovered vulnerabilities that render the computing device susceptible to compromise. Therefore, a network administrator may choose to simply disable the remote management functionality to prevent compromise of the device.

Techniques described herein provide for a gateway device that securely manages access to the remote management functionality of a host device, such as a computing device like a computer. The gateway device permits remote management of the host device over the network, even if the logical network ports over the host device's remote management functionality is accessible are closed or otherwise restricted. The gateway device further minimizes the potential for and the severity of compromise of the host device via its remote management functionality.

FIGS. 1A, 1B, 1C, 1D, and 1E show different examples of a gateway device 102. The gateway device 102 interconnects a host device 104 to a network 106, and securely manages access to the remote management functionality of the host device 104 over the network 106 by a client device 107. The gateway device 102 may be a discrete physical device in the form of a dongle that is directly connected to the host device 104, without any intervening devices. The gateway device 102 may be for and thus be able to connect to just one host device 104, and not multiple host devices. The gateway device 102 includes a managed network switch 108, a processor 110, and memory 112.

The host device 104 may be a computing device, such as a computer like a server, blade, desktop, laptop, or notebook computer. The remote management functionality may be out-of-band, or hardware-based, remote management functionality. The network 106 may be an outside or external network, such as the Internet. The gateway device 102 may connect to the network 106 via one or multiple intervening network devices, such as routers, firewalls, and other network devices that separate a local network, such as a local-area network (LAN) or an intranet, which includes the devices 102 and 104 from the network 106. The client device 107 may also be a computing device like a computer.

In the example of FIG. 1A, the managed network switch 108 includes a physical or hardware network interface 114 that communicatively connects the gateway device 102 to the network 106. The network switch 108 further includes physical or hardware network interfaces 116 and 118 that are communicatively connected to respective network interfaces 120 and 122 of the host device 104, such as directly without any intervening devices. The network interface 114 is thus a network-facing network interface, whereas the network interfaces 116 and 118 are host-facing network interfaces. The network switch 108 is managed in that the network interfaces 114, 116, and 118 can be configured.

The host device 104 exposes its remote management functionality at the network interface 120, and may not expose its remote management functionality at the network interface 122. The host device 104 may use the network interface 122 for network communication unrelated to its remote management functionality. For instance, the service processor or other processor separate from the main processor and that provides the remote management functionality may be connected to the network interface 120 (and may not be connected to the network interface 122). The main processor that runs the operating system and other program code is connected to the network interface 122 (and may not be connected to the network interface 120). The host device 104 may not have any other communicative connection with the network 106 except through the gateway device 102.

The network switch 108 redirects both incoming and outgoing network communication related to the remote management functionality of the host device 104 to the processor 110. Specifically, the network switch 108 is configured to route incoming network traffic received from over the network 106 at the network interface 114 that is related to the remote management functionality of the host device 104 to the processor 110. The network switch 108 is similarly configured to route outgoing network traffic received from the host device 104 at the network interface 116 to the processor 110. Such network traffic is related to the remote management functionality, because the host device 104 sends remote management functionality-related network traffic just through the network interface 120, and not through the network interface 122.

The network switch 108 is configured to route network traffic from the processor 110 that is related to the remote management functionality of the host device 104 and that is directed to the device 104 to the network interface 116. Network communication related to the remote management functionality thus is routed between the gateway device 102 and the host device 104 through the network interface 116, as opposed to the network interface 118. The network switch 108 is configured to route network traffic from the processor 110 related to the remote management functionality of the host device 104 and that is directed to the client device 107 to the network interface 114.

In one implementation, the network switch 108 may be configured to route incoming network traffic received from over the network 106 at the network interface 114 that is unrelated to the remote management functionality of the host device 104 to the network interface 118. In this implementation, the network switch 108 may likewise be configured to route outgoing network traffic received from the host device 104 at the network interface 118 to the network interface 114. In this implementation, then, network communication unrelated to the remote management functionality is passed through between the host device 104 and the network 106, and is routed between the gateway device 102 and the host device 104 through the network interface 118.

The processor 110 executes program code 124 stored on the memory 112 to securely manage access over the network 106 to the remote management functionality of the host device 104. For instance, the processor 110 may permit access over the network 106 to a limited subset of the remote management functionality of the host device 104. As one example, the processor 110 may restrict the remote management functionality exposed to the network 106 to just powering off and on the host device 104. Therefore, even if access to the gateway device 102 were compromised, compromise of the host device 104 via its remote management functionality is limited to just powering off and on the device 104; the host device 104 is thus unable to be maliciously reconfigured. In this way, the gateway device 102 minimizes the severity of any compromise of the host device 104 via its remote management functionality.

The processor 110 may further securely manage access over the network 106 to the remote management functionality of the host device 104 by restricting which users and/or which client devices 107 are permitted to remotely manage the host device 104. For example, a user may have to be authenticated before being permitted to remotely manage the host device 104, regardless of the client device 107 at which the user is requesting access to the remote management functionality of the host device 104. As another example, the client device 107 may have to be authenticated in addition to or instead of the user before access to the remote management functionality of the host device 104 is permitted. Users may further be tied to particular client devices 107 for authentication purposes, and may be restricted to different subsets of the remote management functionality of the host device 104. In these ways, the gateway device 102 minimizes the potential for compromise of the host device 104 via its remote management functionality.

The processor 110 may expose the remote management functionality of the host device 104 at the network interface 114 on different logical network ports than the network ports on which the host device 104 exposes its remote management functionality at the network interface 120. Therefore, even if the logical network ports on which the host device 104 exposes its remote management functionality are closed at the network interface 114, such as by the intervening network device between the network switch 108 and the network 106, the gateway device 102 still permits remote management of the host device 104. The network ports on which the host device 104 exposes its remote management functionality remain open at the network interface 120 and at the network interface 116.

The processor 110 may expose the remote management functionality of the host device 104 at the network interface 114 via a different protocol, or otherwise in accordance in a different technique, than the protocol via which the host device 104 exposes its remote management functionality at the network interface 120. The specific protocol or other technique by which the host device 104 exposes its remote management functionality at the network interface 120 may therefore remain opaque, and not advertised by the gateway device 102 and thus be unknown to the client device 107. In this way as well, the gateway device 102 can minimize the potential for compromise of the host device 104 via its remote management functionality.

It is noted that one client device 107 is depicted as accessing the remote management functionality of the host device 104 via the gateway device 102. However, more than one client device 107 may access the remote management functionality of the host device 104 via the gateway device 102. For example, a client device 107 may register with the host device 104 as a listener for a type of alert. When the host device 104 generates and sends the alert, the gateway device 102 routes the alert to the client device 107 in question. In another implementation, the gateway device 102 may intercept the alert and perform an action based on the alert, such as to automatically reboot the host device 104 as one example.

In the example of FIG. 1B, the managed network switch 108 again includes the network-facing network interface 114. The network switch 108 includes the host-facing network interface 116, and may or may not include the other host-facing network interface 118 as it does in FIG. 1A. The network interface 116 is connected to the network interface 120 of the host device 104, such as directly without any intervening devices, and the host device 104 may not include the other network interface 122 as it does in FIG. 1A.

The host device 104 exposes its remote management functionality at the network interface 120, and also uses the network interface 120 for network communication unrelated to its remote management functionality. For instance, the service processor or other processor that provides the remote management functionality may be connected to the network interface 120. The main processor that runs the operating system and other program code is also connected to the network interface 120. The host device 104 may not have any other communicative connection with the network 106 except through the gateway device 102.

The network switch 108 redirects both incoming and outgoing network communication related to the remote management functionality of the host device 104 to the processor 110. Specifically, the network switch 108 is configured to route incoming network traffic received from over the network 106 at the network interface 114 that is related to the remote management functionality of the host device 104 to the processor 110. The network switch 108 is similarly configured to route outgoing network traffic received from the host device 104 at the network interface 116 that is related to the remote management functionality from the host device 104 to the processor 110.

The network switch 108 is configured to route network traffic from the processor 110 related to the remote management functionality of the host device 104 and that is directed to the device 104 to the network interface 116. Network communication related to the remote management functionality is thus routed between the gateway device 102 and the host device 104 through the network interface 116. The network switch 108 is configured to route network traffic from the processor 110 related to the remote management functionality of the host device 104 and that is directed to the client device 107 to the network interface 114.

In one implementation, the network switch 108 may be configured to route incoming network traffic received from over the network 106 at the network interface 114 that is unrelated to the remote management functionality of the host device 104 to the network interface 116. In this implementation, the network switch 108 may likewise be configured to route outgoing network traffic received from the host device 102 at the network interface 118 to the network interface 114. In this implementation, then, network communication unrelated to the remote management functionality is passed through between the host device 104 and the network 106.

Both network communication related and unrelated to the remote management functionality is thus routed between the gateway device 102 and the host device 104 through the same network interface 116. This is one difference between the examples of FIGS. 1A and 1B. Other differences can include that the network switch 108 of FIG. 1B may not include the network interface 118 and/or that the host device 104 of FIG. 1B may not include the network interface 122. The processor 110 executes program code 124 stored on the memory 112 to securely manage access over the network 106 to the remote management functionality of the host device 104, as has been described in reference to FIG. 1A.

In both the examples of FIGS. 1A and 1B, the gateway device 102 may pass through network communication between the host device 104 and the network 106 that is unrelated to the remote management functionality of the host device 104. In another implementation, the program code 124 may be executed by the processor 110 to additionally or instead act as a remote desktop session proxy between remote desktop session server software running on the host device 104 and remote desktop session client software running on the client device 107. The remote desktop session server software runs on the operating system of the host device 104, and is not part of the remote management functionality of the device 104.

In this implementation, the gateway device 102 functions as a remote desktop session client to the host device 104, which functions as a remote desktop session server to the gateway device 102. The gateway device 102 in turn functions as a remote desktop session server to the client device 107, which functions as a remote desktop session client to the gateway device 102. In such an implementation, the gateway device 102 can securely manage the remote management functionality of the host device 104 in the context of being a remote desktop session proxy between the host device 104 and the client device 107.

For example, while the client device 107 is remotely operating the host device 104 via a remote desktop session, the client device 107 may also remote manage the host device 104 via the remote management functionality of the host device 104 as securely managed by the gateway device 102. If the host device 104 were to freeze, crash, lock up, or otherwise become operable during the remote desktop session, the client device 107 may thus be able to remotely reboot the host device 104 via the remote management functionality. Similarly, the client device 107 may be able to monitor the host device 104 out-of-band via the remote management functionality, while remotely operating the host device 104 in-band via the remote desktop session.

Figures 1C, 1D:
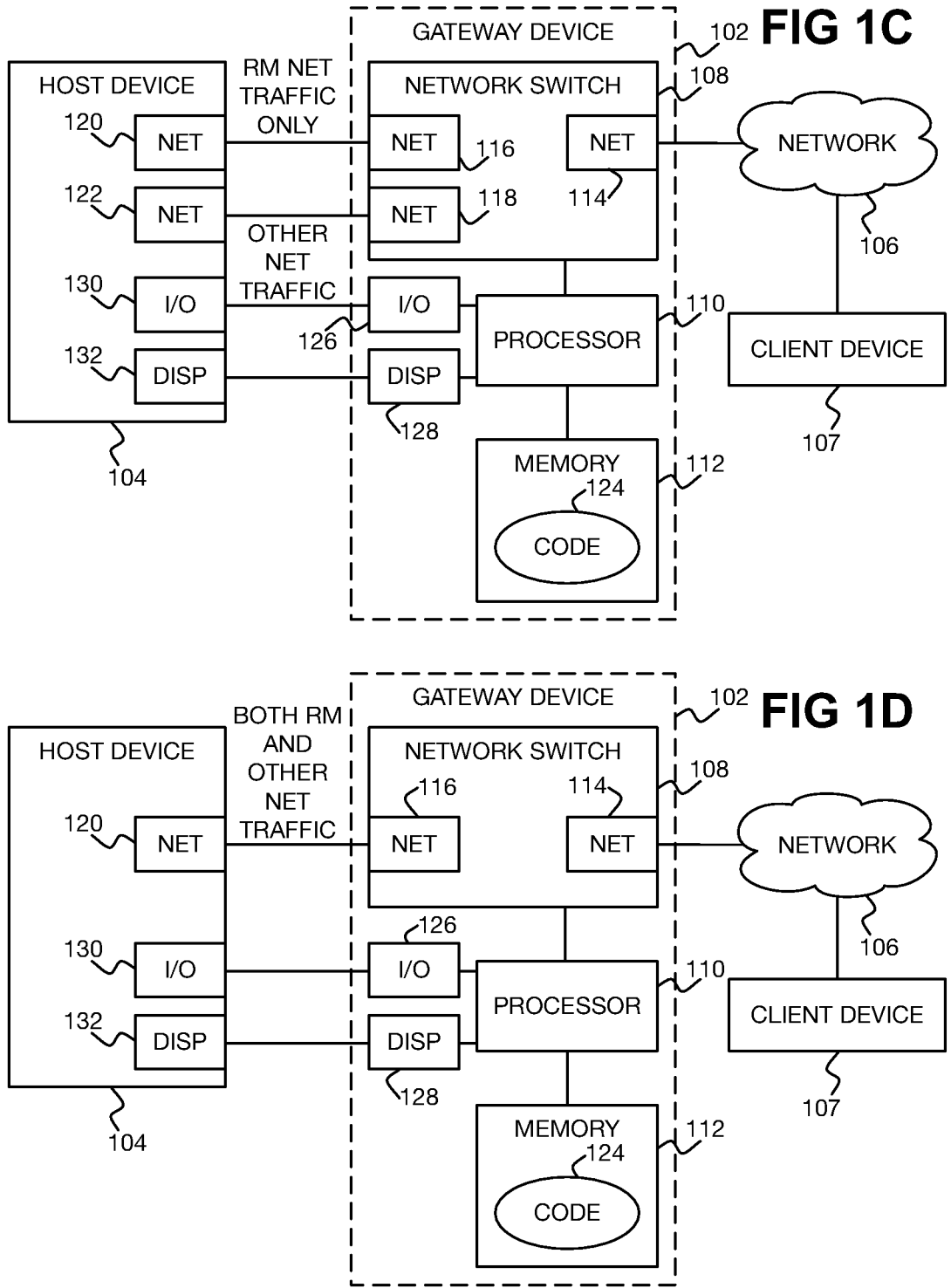

In the example of FIG. 1C, the managed network switch 108 again includes the network-facing interface 114 as in FIGS. 1A and 1B. The network switch 108 includes the host-facing network interfaces 116 and 118, which are communicatively connected to the network interfaces 120 and 122 of the host device 104, respectively, as in FIG. 1A, such as directly without any intervening devices. The host device 104 exposes its remote functionality at the network interface 120, may not expose its remote management functionality at the network interface 122, and may use the network interface 122 for network communication unrelated to its remote management functionality, also as in FIG. 1A. The network switch 108 likewise redirects both incoming and outgoing network communication related to the remote management functionality of the host device 104 to the processor 110 as in FIG. 1A.

The gateway device 102 further includes a physical or hardware input/output (I/O) interface 126 that is communicatively connected to an I/O interface 130 of the host device 104, such as directly without any intervening devices. The I/O interfaces 126 and 130 may each be one or multiple Universal Serial Bus (USB) ports, one or multiple Personal System/2 (PS/2) ports, or another type of I/O interface. The I/O interface 130 of the host device 108 is receptive to connection of input devices such as keyboards and pointing devices (e.g., mice, touchpads, and so on) by which the host device 104 can be directly provided input. The gateway device 102 emulates such input devices, and thus acts as virtual such input devices, via the I/O interface 126.

The gateway device 102 may also include a storage and expose the storage to the host device 104 as a removable storage device on the I/O interface 126. For instance, the storage may be exposed as a USB removable storage device to the host device 104. The host device 104 may use the storage as a local storage device. Because the storage is exposed on just the I/O interface 126 and not exposed on the network interface 114, the storage can be used by the host device 104 in a secure manner.

The gateway device 102 includes a physical or hardware display interface 128 as well, which is communicatively connected to a display interface 132 of the host device 104, such as directly without any intervening devices. The display interfaces 128 and 132 may each be one or multiple High-Definition Multimedia Interface (HDMI) connectors, one or multiple DisplayPort connectors, or another type of display interface. The display interface 132 of the host device 130 is receptive to connection of one or multiple display devices, such as monitors, by which the host device 104 can directly provide output. The gateway device 102 emulates one or multiple such display devices, and thus acts as one or multiple virtual such display devices, via the display interface 132. The display interface 128 and the I/O interface 126 may be part of the same interface, such as a Thunderbolt connector, which is connected to a corresponding interface of the host device 104, of which the display interface 132 and the I/O interface 130 are a part.

As in the FIGS. 1A and 1B, the gateway device 102 may pass through network communication between the host device 104 and the network 106 that is unrelated to the remote management functionality of the host device 104. Furthermore, the program code 124 can be executed by the processor 110 to additionally or instead act as a keyboard-video-mouse (KVM) proxy between the I/O and display interfaces 130 and 132 of the host device 104 and the client device 107. For instance, the gateway device 102 can function as a KVM over Internet Protocol (IP), or remote access KVM, device.

The gateway device 102 thus receives network communication from the client device 107 that encapsulates input entered via one or multiple input devices at the client device 107. The gateway device 102 decapsulates the input and provides it to the host device 104 via the I/O interface 126 as if the input device or devices in question were directly connected to the I/O interface 130 of the host device 104. The gateway device 102 similarly receives display output from the host device 107 via the display interface 128 as if the gateway device 102 were one or multiple display devices connected to the display interface 132 of the host device 104. The gateway device 102 encapsulates the display output within network communication that the gateway device 102 sends to the client device 107.

The gateway device 102 can securely manage the remote management functionality of the host device 104 in the context of being a KVM proxy between the host device 104 and the client device 107. For example, while the client device 107 is remotely operating the host device 104 via a remote KVM session, the client device 107 may also manage the host device 104 via the remote management functionality of the host device 104 as securely managed by the gateway device 102. But for the gateway device 102 providing such remote KVM functionality, the device 102 can otherwise operate as has been described in reference to FIG. 1A.

In the example of FIG. 1D, the managed network switch 108 again includes the network-facing interface 114 as in FIGS. 1A, 1B, and 1C. The network switch 108 includes the host-facing network interface 116, which is communicatively connected to the network interface 120 of the host device 104 as in FIG. 1B, such as directly without any intervening devices. The host device 104 exposes its remote functionality at the network interface 120, and may further use the network interface 120 for network communication unrelated to its remote management functionality, also as in FIG. 1B. The network switch 108 redirects both incoming and outgoing network communication related to the remote management functionality of the host device 104 to the processor as in FIG. 1B.

The gateway device 102 includes the I/O and display interfaces 126 and 128, which are communicatively connected to respective I/O and display interfaces 130 and 132 of the host device 104 as in FIG. 1C, such as directly without any intervening devices. As in FIGS. 1A, 1B, and 1C, the gateway device 102 may pass through network communication between the host device 104 and the network 106 that is unrelated to the remote management functionality of the host device 104. Furthermore, the program code 124 can be executed by the processor 110 to additionally or instead act as a KVM proxy between the I/O and display interfaces 130 and 132 of the host device 104 and the client device 107 as in FIG. 1C. But for the gateway device 102 providing remote KVM functionality, the device 102 can otherwise operate as has been described in reference to FIG. 1B.

Figure 1E:
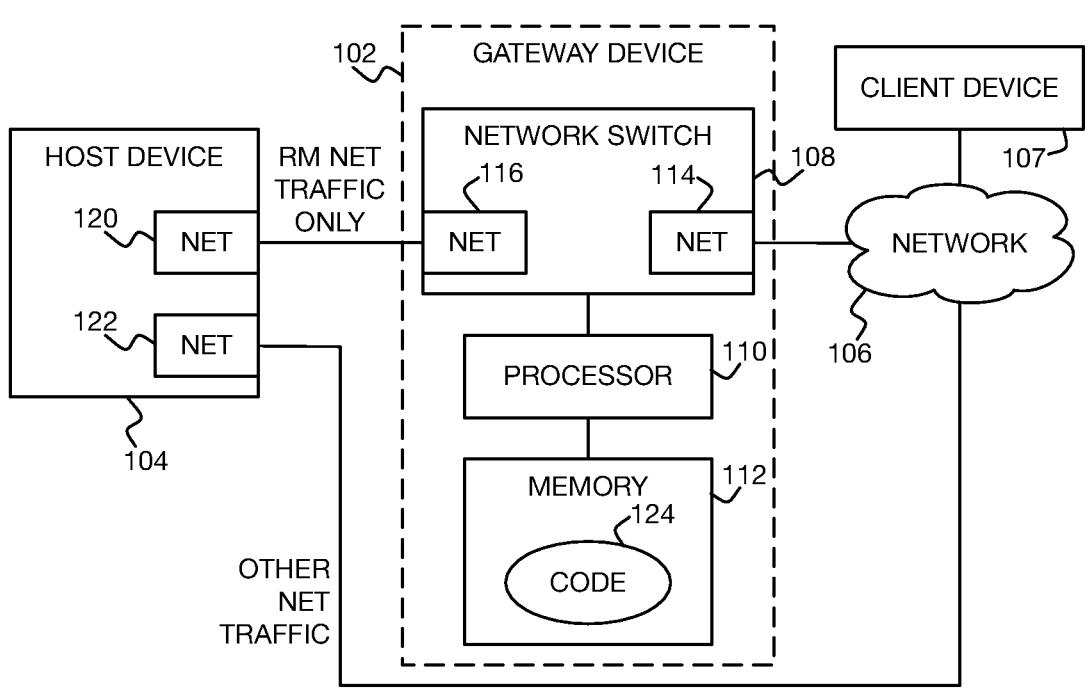

In the example of FIG. 1E, the managed network switch 108 again includes the network-facing network interface 114 as in FIGS. 1A and 1B. The network switch 108 includes the host-facing network interface 116, and may or may not include the other host-facing network interface 18 as it does in FIG. 1A. The network interface 116 is connected to the network interface 120 of the host device 104, such as directly without any intervening devices. The host device 104 includes the network interface 122 as in FIG. 1A. However, the network interface 122 bypasses the gateway device 102 in being connected to the network 106. For example, the network interface 122 may be connected to the network 106 via one or multiple intervening network devices, which may be the same network devices via which the gateway device 102 is connected to the network 106.

The host device 104 exposes its remote management functionality at the network interface 120, and may not expose its remote management functionality at the network interface 122 as in FIG. 1A. The host device 104 may use the network interface 122 for network communication unrelated to its remote management functionality, also as in FIG. 1A. However, unlike in FIG. 1A, the host device 104 has a communicative connection with the network 106 apart from the gateway device 102, via the network interface 122. Therefore, unlike in FIGS. 1A and 1B, the host device 104 is not exclusively connected to the network 106 through the gateway device 102.

The network switch 108 redirects both incoming and outgoing network communication related to the remote management functionality of the host device 104 to the processor 110. The network switch 108 may receive incoming network communication from over the network 106 related to just the remote management functionality of the host device 104, and may receive outgoing network communication from the host device 104 related to just the remote management functionality of the device 104. That is, the network switch 108 may not receive incoming network traffic from over the network 106 unrelated to the remote management functionality of the host device 104, and may not receive outgoing network communication from the host device 104 unrelated to the remote management functionality of the device 104.

The network switch 108 is configured to route incoming network traffic received from over the network 106 at the network interface 114 that is related to the remote management functionality of the host device 104 to the processor 110. The network switch 108 is similarly configured to route outgoing network traffic received from the host device 104 at the network interface 116 to the processor 110. Such network traffic is related to the remote management functionality, because the host device 104 sends remote management functionality-related network traffic just through the network interface 120, and not through the network interface 122.

The network switch 108 is configured to route network traffic from the processor 110 that is related to the remote management functionality of the host device 104 and that is directed to the device 104 to the network interface 116. Network communication related to the remote management functionality thus is routed between the gateway device 102 and the host device 104 through the network interface 116 as in FIGS. 1A and 1B. The network switch 108 is configured to route network traffic from the processor 110 related to the remote management functionality of the host device 104 and that is directed to the client device 107 to the network interface 114. The processor 110 executes program code 124 stored on the memory 112 to securely manage access over the network 106 to the remote management functionality of the host device 104, as has been described in reference to FIG. 1A.

In one implementation, the network switch 108 may be configured to drop incoming network traffic received from over the network 106 at the network interface 114 that is unrelated to the remote management functionality of the host device 104. In this implementation, the network switch 108 may likewise be configured to drop outgoing network traffic received from the host device 104 at the network interface 116. In this implementation, then, network communication unrelated to the remote management functionality is not passed through between the host device 104 and the network 106. In such an implementation, the gateway device 102 cannot act as a remote desktop session proxy, or as a KVM proxy if the gateway device 102 also includes the I/O and display interfaces 126 and 128 as in FIGS. 1C and 1D, between the host device 104 and the client device 107. This is because remote management functionality-unrelated network traffic is not redirected to the processor 110.

FIG. 2 shows an example non-transitory computer-readable data storage medium 200. The computer-readable data storage medium 200 stores program code 202 that is executable by the gateway device 102 to perform processing in order to securely manage access to the remote management functionality of the host device 104. The processing includes receiving a client request from the client device 107 to access the host remote management functionality (204). The gateway device 102 receives the client request via the network-facing network interface 114 of the network switch 108. The client request may be received as part of a remote desktop session or a remote KVM session between the host device 104 and the client device 107 in the case in which the gateway device 102 is respectively acting as a remote desktop session proxy or as a remote KVM proxy.

The client request may be received on a different logical network port than the port on which the host device 104 exposes its remote management functionality on the network interface 120. The client request may be in accordance with a different protocol than the protocol in accordance with which the host device 104 exposes its remote management functionality on the network interface 120. More generally, the client request that the gateway device 102 receives be in a format not understandable by the host device 104. For instance, if the client request were passed through to the host device 104, the host device 104 would not be able to interpret the request to perform the requested host remote management functionality.

The processing includes determining whether to grant the client request (206), as described in more detail below. If the gateway device 102 determines that the client request should not be granted (208), the processing can include then sending in response a client response to the client device 107 denying the requested client device access to the remote management functionality of the host device 104 (210). The gateway device 102 sends the client response via the network-facing network interface 114 of the network switch 108. Instead of sending a client response denying the client request, the gateway device 102 may just drop the client request and not respond to the client request.

If the gateway device 102 determines that the client request should be granted (208), the processing includes generating a host request corresponding to the client request and that is understandable by the host device 102 (212). The gateway device 102 may generate the host request in accordance with the protocol that the host device 104 exposes its remote management functionality in accordance with on the network interface 120. The gateway device 102 may thus translate the host request to a format understandable by the host device 104.

The processing includes sending the generated host request to the host device 102 (104), thus permitting the client device 107 access to the remote management functionality of the host device 102 in accordance with the client request. The gateway device 102 sends the host request via the host-facing network interface 116 at which remote management functionality-related network communication occurs. That is, the gateway device 102 sends the host request via the network interface 116 that is connected to the network interface 120 on which the host device 102 exposes its remote management functionality. The gateway device 102 sends the host request on the logical network port on which the host device 104 exposes its remote management functionality.

The processing can include receiving a host response from the host device 102 that corresponds to the host request and thus to the client request (216). The gateway device 102 receives the host response via the host-facing network interface 116. The processing can include responsively generating a client response corresponding to the host response and that is understandable by the client device 107 (218). The gateway device 102 may generate the client response in accordance with the same protocol as the received client request was received in accordance with. More generally, the gateway device 102 may translate the host response to a format understandable by the client device 107.

The processing includes sending the generated client response to the client device 107 (220). The gateway device 102 sends the client response via the network-facing network interface 114 of the network switch 108. The gateway device 102 may send the client response on the same logical network port on which the client request was received. The client response may be sent as a part of a remote desktop session or a remote KVM session between the host device 104 and the client device 107 in the case in which the gateway device 102 is respectively acting as a remote desktop session proxy or as a remote KVM proxy.

Figure 3:
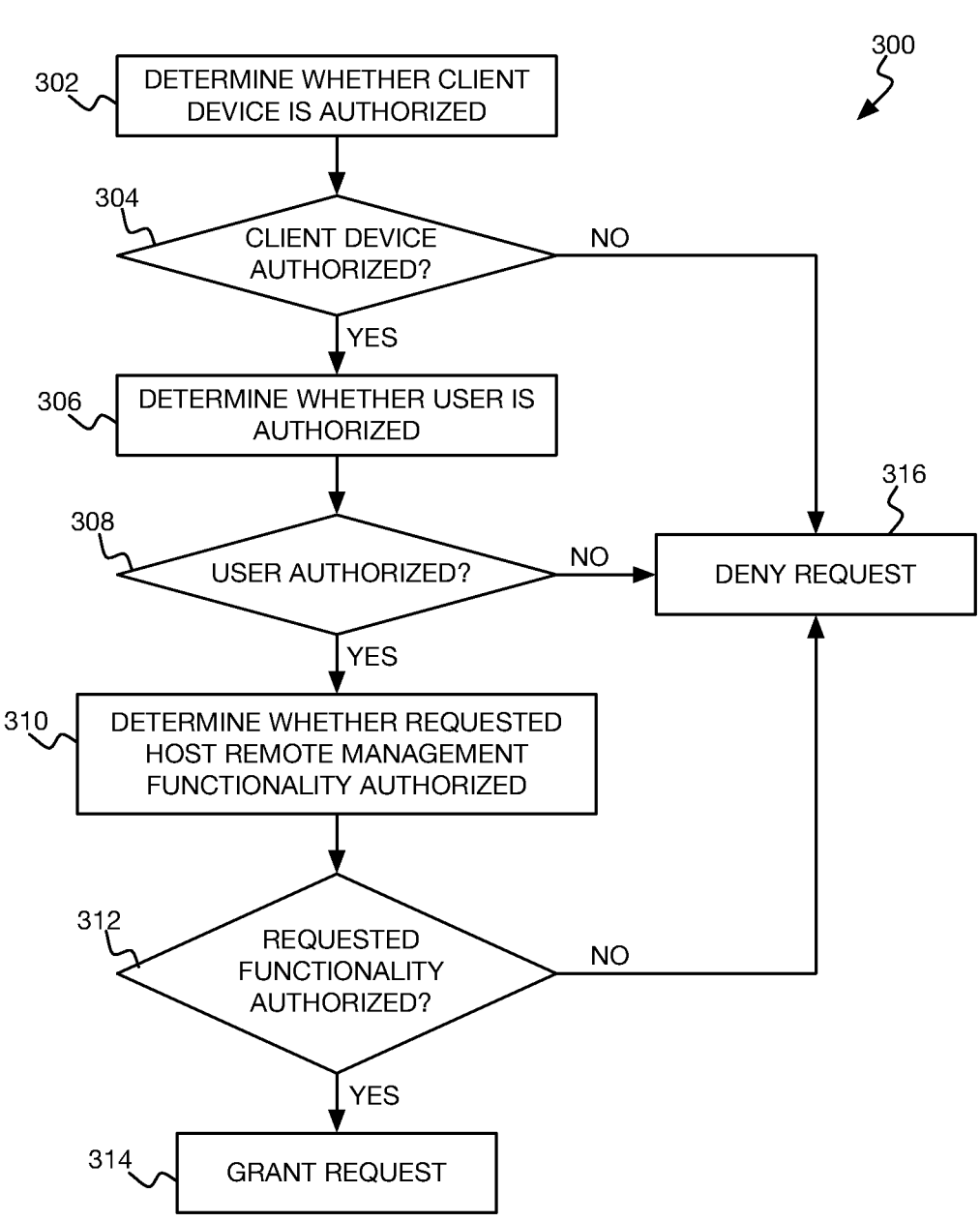
FIG. 3 is a flowchart of an example method executable by a gateway device to determine whether to permit access to the remote management functionality of a host device over a network.

FIG. 3 shows an example method 300 for determining whether to permit access to the remote management functionality of the host device 104 over the network 106. The gateway device 102 may perform the method 300 in part 208 of FIG. 2 to determine whether to grant a client request to access the host remote management functionality received from the client device 107. The gateway device 102 can determine whether the client device 107 is authorized to access the host remote management functionality (302), whether the user of the client device 107 is so authorized (304), and whether the requested host remote management functionality is authorized (310).

The gateway device 102 can determine whether the client device 107 is authorized by authenticating the client device 107 as has been described in relation to FIG. 1. The gateway device 102 can similarly determine whether the user of the client device 107 is authorized by authenticating the user as has been described in relation to FIG. 1. The gateway device 102 can determine whether the requested host remote management functionality is authorized by determining whether the specific functionality to which the client device 107 is requesting access is part of a permitted subset of the remote management functionality that the host device 104 exposes at the network interface 120, as has also been described in relation to FIG. 1.

If the client device is authorized (304), the user is authorized (308), and the requested host remote management functionality is authorized (310), then the client request to access the host remote management functionality is granted (314). If the client device is not authorized (304), the user is not authorized (308), or the requested host remote management functionality is not authorized (310), then the client request is denied (316). The order in which the authorization determinations are performed can vary from the order depicted in FIG. 3. Similarly, just one or two of the authorization determinations to decide whether to permit or deny access to the remote management functionality of the host device 104.

Techniques have been described for securely managing access to host remote management functionality. The described gateway device 102 permits remote management of the host device 104 over the network 106, even if the logical network ports on which the remote management functionality of the host device 104 are closed or otherwise restricted. The gateway device 102 minimizes the potential for and the severity of compromise of the host device 104 via its remote management functionality, and can serve as the exclusive way by which the host device 104 is communicatively connected to the network 106.

We claim:

1. A gateway device comprising:
a processor;
a host-facing network interface to connect to a network interface of a host device at which remote management functionality of the host device is exposed;
a network-facing network interface to connect to a network;
a first network port to expose remote functionality of the host device, wherein the first network port is open at the network interface of the host device and at the host-facing network interface, and wherein the first network port is closed at the network-facing network interface;
a network switch to drop first incoming network traffic received over the network at the network-facing network interface that is determined by the gateway device to be unrelated to the remote management functionality of the host device and to route second incoming network traffic determined by the gateway device to be related to the remote management functionality of the host device to the processor of the gateway device,
wherein the processor is to:
receive the second incoming network traffic, and
route the second incoming network traffic to the host-facing network interface; and a memory storing program code executable by the processor to securely manage access over the network to the remote management functionality of the host device,
wherein the network-facing network interface is to receive a client request from a client device on a second network port over which the remote functionality is not exposed,
wherein the gateway device is further to:
determine that the client request received over the network is in a format not understandable by the host device and is related to the remote management functionality of the host device;
grant the client request;
in response to granting the client request, generate a host request corresponding to the client request and in a format that is understandable by the host device; and
send, via the host-facing network interface, the host request to the host device to permit the client device access to the remote management functionality of the host device in accordance with the client request.

2. The gateway device of claim 1, wherein the program code is executable by the processor to permit access over the network to a limited subset of the remote management functionality of the host device.

3. The gateway device of claim 1, wherein the host-facing network interface is a first host-facing network interface, the network interface of the host device is a first network interface of the host device, and the gateway device further comprises:
a second host-facing network interface to connect to a second network interface of the host device at which the remote management functionality of the host device is not exposed.

4. The gateway device of claim 3, wherein network communication related to the remote management functionality of the host device is routed through the first host-facing network interface, and network communication unrelated to the remote management functionality of the host device is routed through the second host-facing network interface.

5. The gateway device of claim 3, further comprising:
the network switch that includes the first and second host-facing and the network-facing network interfaces, the network switch to redirect communication related to the remote management functionality of the host device to the processor.

6. The gateway device of claim 1, further comprising:
the network switch of which the host-facing and the network-facing network interfaces area a part, the network switch to redirect communication related to the remote management functionality of the host device to the processor.

7. The gateway device of claim 1, wherein both network communication related to the remote management functionality of the host device and network communication unrelated to the remote management functionality of the host device are routed through the host-facing network interface.

8. The gateway device of claim 1, wherein a logical network port on which the remote management functionality of the host device is accessible is open at the network interface of the host device and at the host-facing network interface, and is closed at the network-facing network interface.

9. The gateway device of claim 1, wherein network communication unrelated to the remote management functionality of the host device is passed through between the host device and the network.

10. The gateway device of claim 1, wherein the program code is executable by the processor to act as a remote desktop session proxy between remote desktop session server software running on the host device and remote desktop session client software running on the client device connected to the network.

11. The gateway device of claim 1, further comprising:
an input/output (I/O) interface to connect to an I/O interface of the host device; and a display interface to connect to a display interface of the host device,
wherein the program code is executable by the processor to act as a keyboard-video mouse (KYM) proxy between the I/O and display interfaces of the host device and the client device connected to the network.

12. The gateway device of claim 1, wherein the processor of the gateway device routes network traffic, relating to remote management functionality of the host device, to the client device via the network-facing network interface.

13. A non-transitory computer-readable data storage medium storing program code that when executed by a gateway device cause the gateway device to perform processing comprising:
receiving, via a network-facing network interface of the gateway device, a client request from a client device on a first network port over which remote functionality is not exposed to access remote management functionality of a host device connected to a host-facing network interface of the gateway device;
exposing, at a second network port, remote functionality of the host device, wherein the second network port is open at a network-facing network interface of the host device and at the host-facing network interface of the gateway device, and wherein the second network port is closed at the network-facing network interface of the gateway device;
determining, by the gateway device, that the client request received over the network is in a format not understandable by the host device and is related to the remote management functionality of the host device;
granting the client request;
in response to granting the client request, generating a host request corresponding to the client request and in a format that is understandable by the host device;

sending, by the gateway device, via the host-facing network interface, the host request to the host device to permit the client device access to the remote management functionality of the host device in accordance with the client request;
receiving, by a network switch of the gateway device, incoming network traffic;
routing, by the network switch, a portion of the incoming network traffic to a processor of the gateway device, wherein the portion of the incoming network traffic is related to the remote management functionality of the host device; and
routing, by the processor, the portion of the incoming network traffic to the host device.

14. The non-transitory computer-readable data storage medium of claim 13, wherein the processing further comprises:
receiving, via the host-facing network interface of the gateway device, a host response from the host device;
responsively generating a client response corresponding to the host response and understandable by the client device; and
sending, via the network-facing network interface of the gateway device, the client response to the client device.

15. The non-transitory computer-readable data storage medium of claim 13, wherein the processing further comprises:
in response to determining not to grant the client request, sending to the client device, via the network-facing network interface of the gateway device, a client response denying the client device access to the remote management functionality of the host device in accordance with the client request.

16. The non-transitory computer-readable data storage medium of claim 12, wherein the gateway device routes an alert from the host device to the client device.

17. The non-transitory computer-readable data storage medium of claim 16, wherein the gateway device automatically reboots the host device in response to the alert.

* * * * *